(12) United States Patent
Tomita

(10) Patent No.: US 6,965,551 B2
(45) Date of Patent: Nov. 15, 2005

(54) RECORDING DISK AND RECORDING APPARATUS HAVING A COPY PREVENTION FEATURE

(75) Inventor: Yoshimi Tomita, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 323 days.

(21) Appl. No.: 10/385,690

(22) Filed: Mar. 12, 2003

(65) Prior Publication Data

US 2003/0179663 A1    Sep. 25, 2003

(30) Foreign Application Priority Data

Mar. 22, 2002  (JP) .............................. 2002-080828

(51) Int. Cl.$^7$ .............................................. G11B 7/00
(52) U.S. Cl. ................ 369/53.3; 369/53.32; 369/275.3
(58) Field of Search .......................... 369/44.13, 44.26, 369/275.3, 53.12, 53.13, 53.15, 53.17, 53.18, 369/53.32

(56) References Cited

U.S. PATENT DOCUMENTS 5,043,965 A * 8/1991 Iida et al. ................. 369/44.13

FOREIGN PATENT DOCUMENTS

| EP | 0 643 391 A1 | 3/1995 |
|----|--------------|--------|
| EP | 0 813 189 A1 | 12/1997 |
| JP | 2001 - 76345 | 3/2001 |
| WO | WO98/18121 | 4/1998 |
| WO | WO99/10884 | 3/1999 |

* cited by examiner

*Primary Examiner*—Nabil Hindi
(74) *Attorney, Agent, or Firm*—Morgan Lewis & Bockius LLP

(57) ABSTRACT

A recording disk and a recording apparatus prevent illegal copying. In a reproduction control data area, pits of a pit train on a plurality of adjacent tracks are aligned in the directions which cross the tracks perpendicularly, wherein the pit train represents reproduction control data indicative of a reproduction control method to be used for reproducing information data. The length of a unit interval on the track corresponding to one bit of the reproduction control data is made shorter than a length that is twice as long as a length of rotation jitter which is generated when a spindle motor is rotated under a rotation control method using a frequency generator.

8 Claims, 6 Drawing Sheets

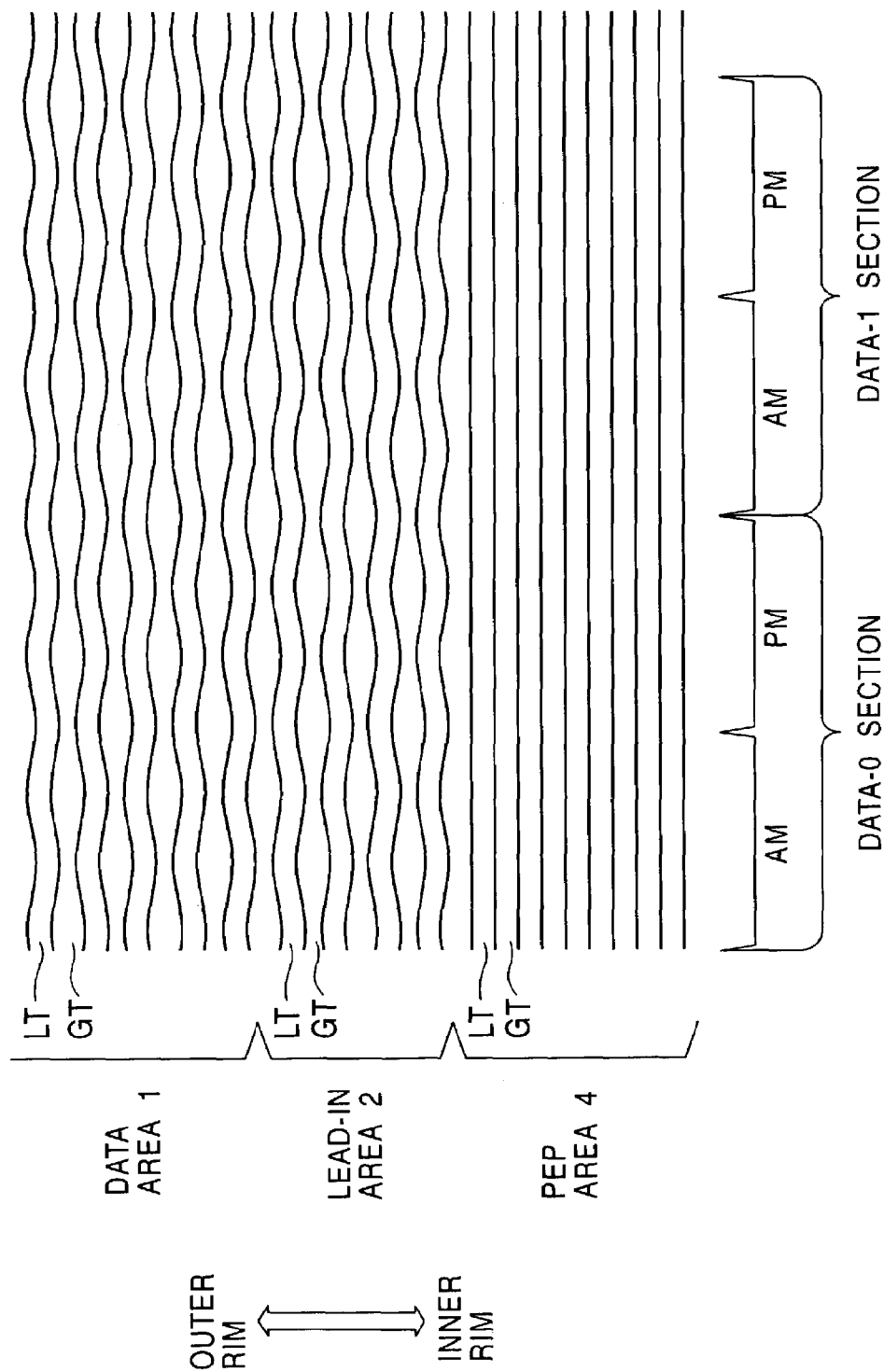

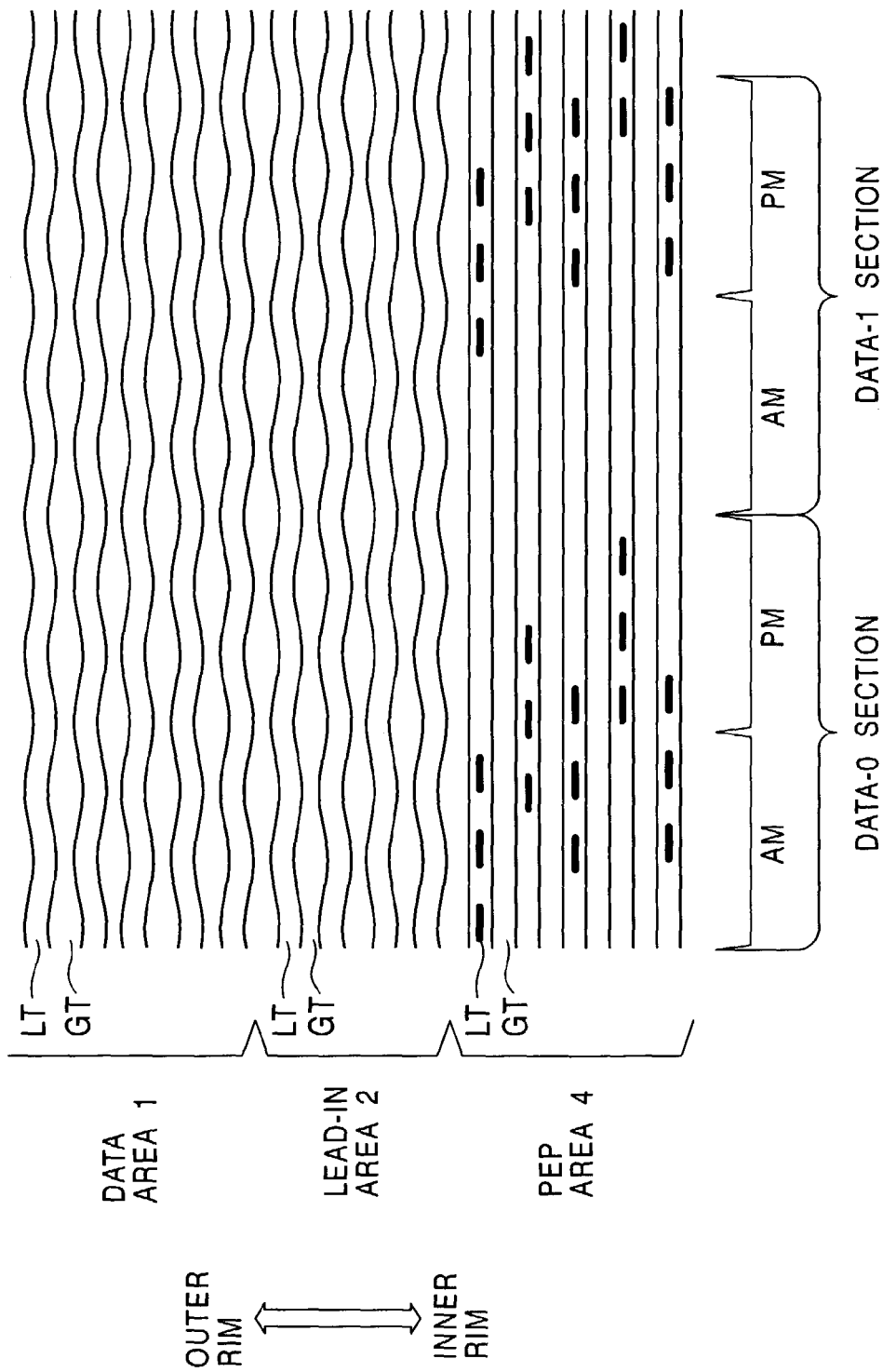

RECORDING DISK AND RECORDING APPARATUS HAVING A COPY PREVENTION FEATURE

BACKGROUND OF THE INVENTION

1. Field of the Invention

The invention relates to a recording disk and a recording apparatus for manufacturing the recording disk.

2. Description of Related Art

In recent years, disk recorders for writing information data onto a recording disk such as DVD-R, DVD-RW, DVD+RW, DVD-RAM which allow recording of information data, have become used widely. With the spread of the disk recorders, it has become indispensable to use a copy preventing process for preventing illegal copying from a recording disk on which information data protected by copyright has previously been recorded.

Particularly, there is a demand for copy prevention of a type that prevents the so called RF copying through which information data is copied onto a writable recording disk from a read only recording disk by directly using an RF signal generated from a pickup of a disk player.

OBJECTS AND SUMMARY OF THE INVENTION

The invention has been made to solve the problem and it is an object of the invention to provide a recording disk and a recording apparatus which can prevent illegal copying.

According to the first aspect of the invention, there is provided a recording disk having: an information data area in which a pit train indicative of information data has been formed on tracks; and a reproduction control data area in which pits of a pit train on a plurality of adjacent tracks are aligned in directions which cross the tracks perpendicularly, the pit train representing reproduction control data indicative of a reproduction control method to be used for reproducing the information data, wherein in the reproduction control data area, a length of a unit interval corresponding to one bit of the reproduction control data on each track is made shorter than a length that is twice as long as a length of rotation jitter which is generated when a spindle motor to rotate the recording disk is rotated at a predetermined constant angular velocity by a drive control method using a frequency generator.

According to the second aspect of the invention, there is provided a recording disk having: an information data area in which tracks to record a pit train indicative of information data have been formed; and a reproduction control data area in which tracks to record a pit train indicative of reproduction control data representing a reproduction control method to be used for reproducing the information data have been formed, wherein in the information data area, the tracks have a wobble shape and in the reproduction control data area, the tracks have a non-wobble shape.

According to the third aspect of the invention, there is provided a recording apparatus for recording information data into an information data area of a recording disk and recording reproduction control data representing a reproduction control method to be used for reproducing the information data into a reproduction control data area of the recording disk, comprising: an information data recording component for recording a pit train indicative of the information data onto tracks in the information data area; a reproduction control data recording component for recording a pit train indicative of the reproduction control data onto tracks in the reproduction control data area so that pits in the pit train on a plurality of adjacent tracks are aligned in directions which cross perpendicularly the tracks, the pit train indicative of the reproduction control data; and a length of a unit interval setting component for setting an interval of the pit trains to be recorded onto the tracks in the reproduction control data area so that a length of a unit interval on the track that corresponds to one bit of the reproduction control data is made shorter than a length that is twice as long as a length of rotation jitter which is caused when a spindle motor to rotate the recording disk is rotated at a predetermined constant angular velocity under a drive control operation using a frequency generator.

According to the fourth aspect of the invention, there is provided a recording apparatus which forms tracks into each of an information data area and a reproduction control data area of a recording disk having the information data area in which information data should be recorded and the reproduction control data area in which reproduction control data representing a reproduction control method to be used for reproducing the information data should be recorded, comprising: an information data area track forming component for forming the tracks in a wobble shape into the information data area; and a reproduction control data area track forming component for forming the tracks in a non-wobble shape into the reproduction control data area.

BRIEF DESCRIPTION OF THE DRAWINGS

FIG. 6 is a diagram showing a form of a surface of a writable recording disk as a recording medium according to the invention; and FIG. 7 is a diagram showing an example of recording marks recorded in a PEP area of the writable recording disk at the time when rotation speed control of a spindle motor is performed by a FG control.

DETAILED DESCRIPTION OF THE PREFERRED EMBODIMENT

Figure 1:
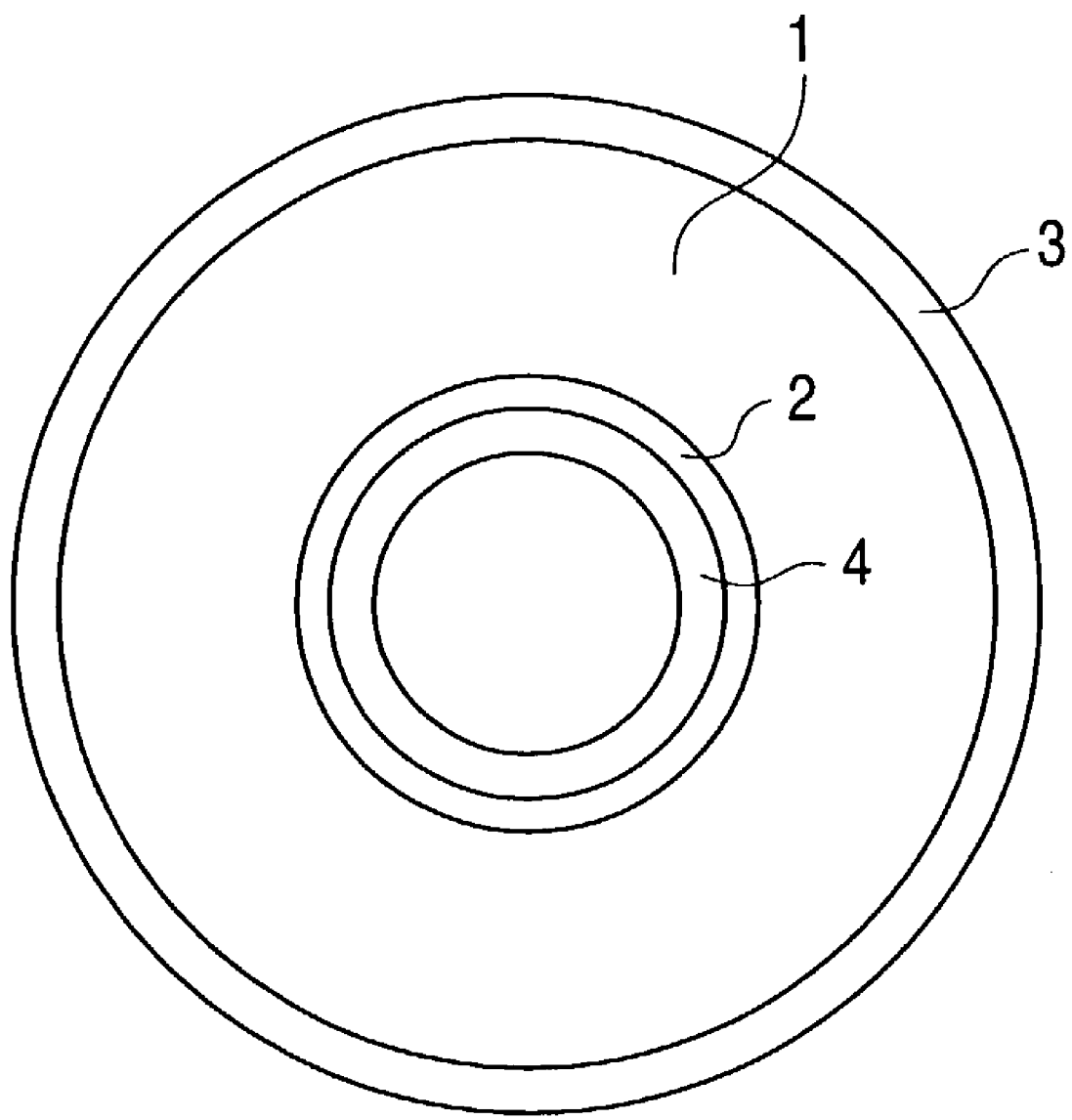
FIG. 1 is a diagram showing a recording area of a recording disk as a recording medium according to the invention.

FIG. 1 is a diagram showing a recording area of a recording disk according to the invention.

As shown in FIG. 1, the recording disk comprises: an information data area 1 in which information data is recorded; a lead-in area 2; a lead-out area 3; and a PEP (Phase Encoded Part) area 4. Lead-in data representing the recording position of the information data recorded in the information data area 1, reproduction time, etc. has been recorded in the lead-in area 2. Reproduction control data including disk information representing the type of the recording disk, tracking information representing a tracking method, copy protection information representing whether copying of the information data recorded in the information data area 1 is permitted or not, etc. has previously been recorded in the PEP area 4. That is, the PEP area 4 is a reproduction control data area for previously recording various reproduction control data which is indispensable when the information data recorded in the information data area 1 of the recording disk is reproduced.

Figure 2:
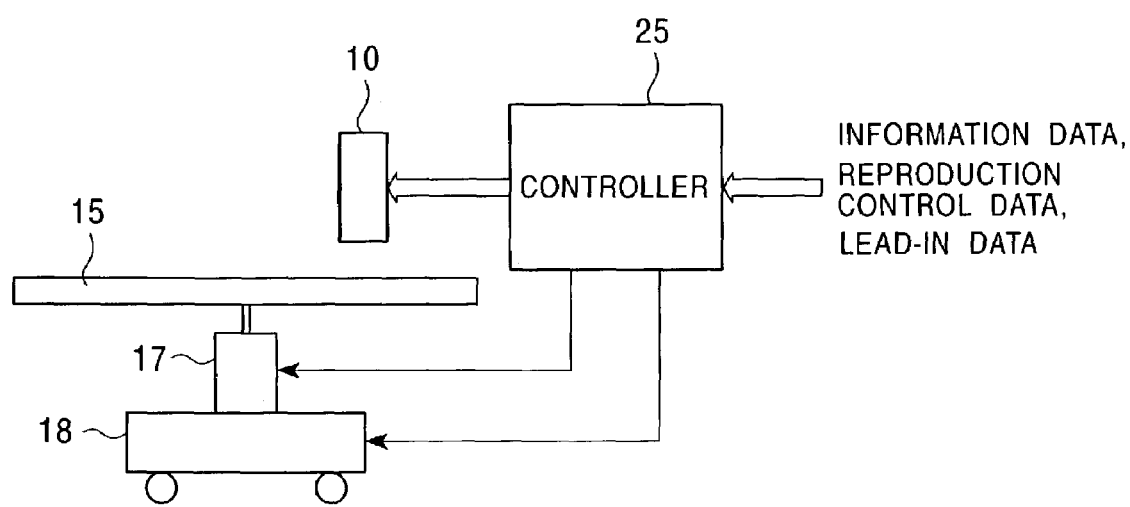
FIG. 2 is a diagram showing a schematic construction of a master disk recording apparatus as an information recording apparatus according to the invention.

FIG. 2 is a diagram showing an example of a construction of a master disk recording apparatus for manufacturing a read only recording disk having the recording areas as mentioned above or a writable recording disk (which will be explained later).

A resist layer for an electron beam is formed on the surface of a master disk 15. A spindle motor 17 drives the master disk 15 to rotate at a constant angular velocity. A feed stage 18 moves the master disk 15 together with the spindle motor 17 along a radial direction of the master disk 15. An electron beam irradiating apparatus 10 directs an electron beam onto the surface of the resist layer of the master disk 15.

When manufacturing the read only recording disk, a controller 25 controls the electron beam irradiating apparatus 10, spindle motor 17, and feed stage 18 as will be explained below.

Figure 3:
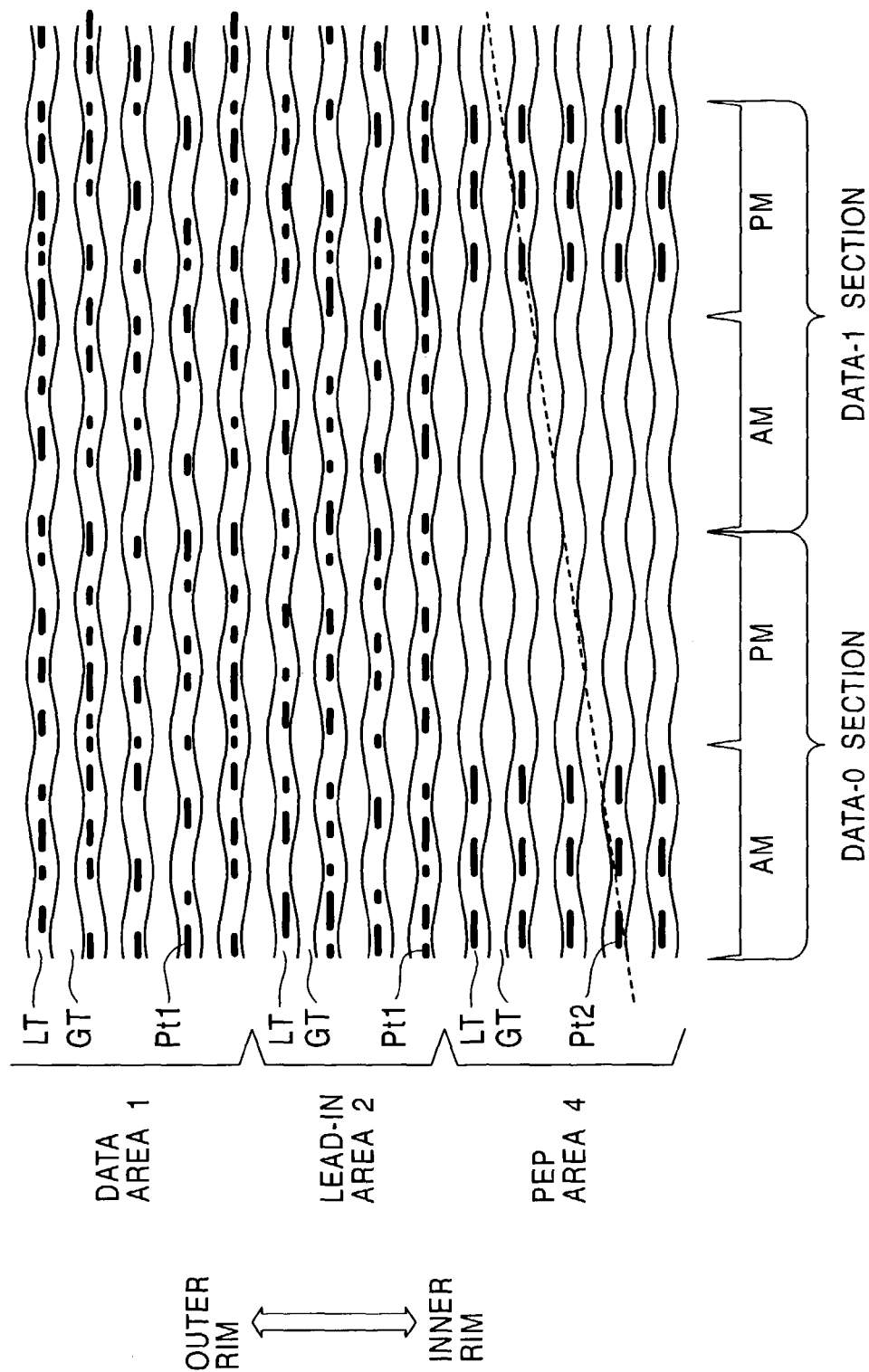
FIG. 3 is a diagram showing a form of a surface of a read only recording disk as a recording medium according to the invention.

First, the controller 25 drives the electron beam irradiating apparatus 10 to direct the electron beam onto the resist layer surface of the master disk 15 while periodically vibrating an irradiation axis of the electron beam in a radial direction of the disk. Further, during this period of time, the controller 25 controls the feed stage 18 so as to be gradually moved in the disk radial direction. By the control as mentioned above, a latent image indicative of a groove track GT which is wobbled in the manner as shown in FIG. 3 is made in a spiral form at positions of the resist layer surface corresponding to each of the PEP area 4, lead-in area 2, information data area 1, and lead-out area 3 of the read only recording disk as shown in FIG. 1. Furthermore, the controller 25 drives the electron beam irradiating apparatus 10 so as to direct the electron beam onto a position corresponding to a portion between the groove tracks GT, that is, a position on the resist layer surface corresponding to a land track LT in accordance with the information data. A latent image corresponding to a recording pit Pt1 indicative of the information data is, thus, formed as shown in FIG. 3 in the position on the resist layer surface corresponding to the land track LT in the information data area 1. The controller 25 drives the electron beam irradiating apparatus 10 so as to direct the electron beam onto a position on the resist layer surface corresponding to a land track LT in the lead-in area 2 in accordance with the lead-in data. A latent image corresponding to a recording pit Pt1 indicative of the lead-in data is, thus, formed as shown in FIG. 3 in the position on the resist layer surface corresponding to the land track LT in the lead-in area 2.

The controller 25 drives the electron beam irradiating apparatus 10 so as to direct the electron beam onto a position on the resist layer surface corresponding to a land track LT in the PEP area 4 in accordance with a phase encoding signal obtained by performing a phase encoding process to the reproduction control data. A latent image corresponding to a recording pit Pt2 indicative of the reproduction control data is, thus, formed as shown in FIG. 3 in the position on the resist layer surface corresponding to the land track LT in the PEP area 4.

The phase encoding process to the reproduction control data is executed as follows.

Figure 4:
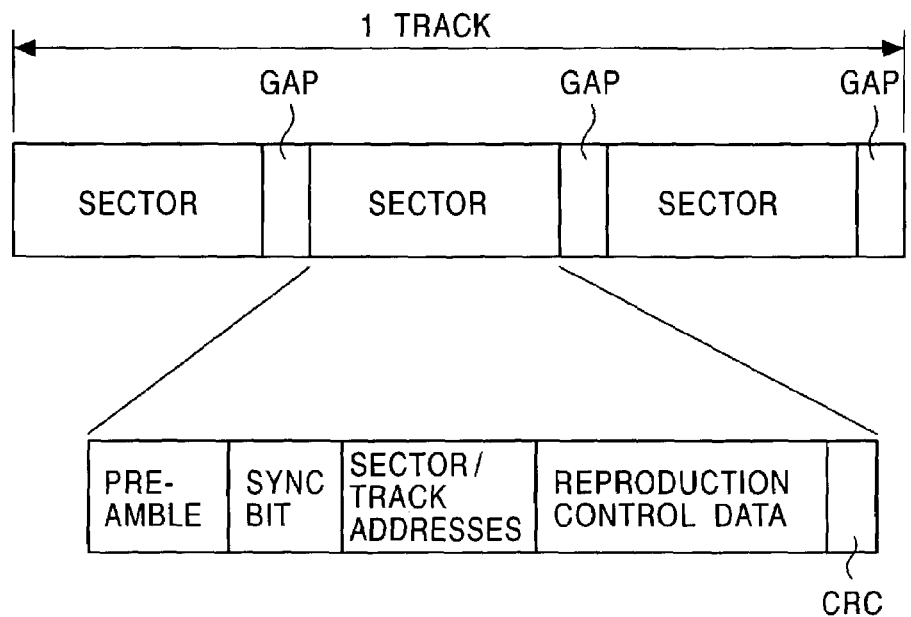
FIG. 4 is a diagram showing a format of a track in a PEP area 4.
Figure 5A:
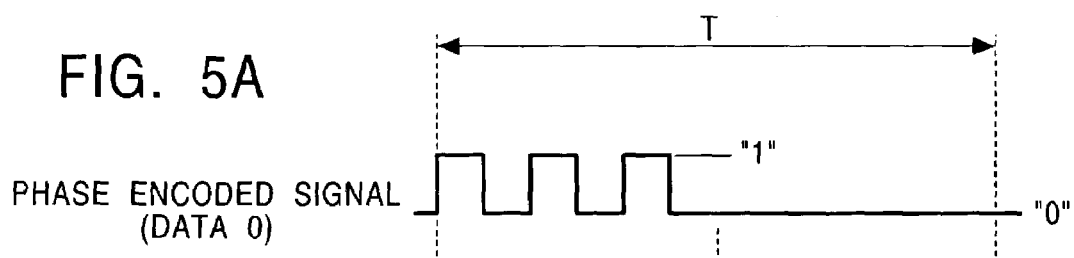
FIGS. 5A and 5B are diagrams each showing a waveform of a phase encoding signal corresponding to the length of one bit of data.
Figure 5B:
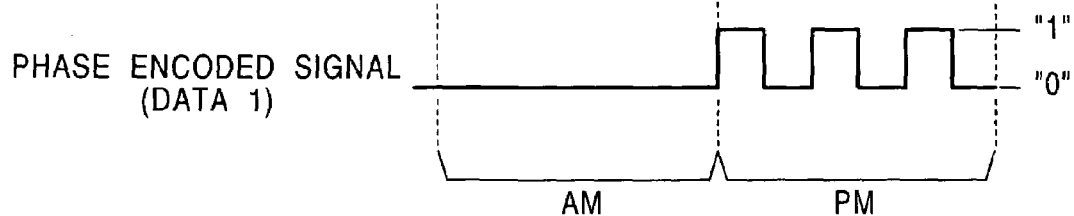

First, in the PEP area 4, an area corresponding to a length of one rotation of the master disk 15 by the land track LT is regarded as one track. As shown in FIG. 4, one track is divided into three sectors. Each sector consists of, for example, a length of 177 bits and a gap of 11 bits is provided between the sectors. One sector comprises: a preamble of 16 bits; a sync bit of 1 bit; track/sector addresses of 24 bits; reproduction control data of 128 bits; and an error detection code of 8 bits. The controller 25 executes a phase encoding process as shown in FIG. 5A or 5B to each of the preamble, sync bit, track address, sector address, reproduction control data, and error detection code, thereby obtaining a phase encoded signal according to a logic level of each bit. For example, as shown in FIG. 5A, the bit of the logic level 0 in the reproduction control data repeats a change of the logic levels 0 and 1 in a former half section AM of a predetermined period of time T and is converted into the phase encoded signal of the fixed logic level 0 in a latter half section PM. As shown in FIG. 5B, the bit of the logic level 1 in the reproduction control data is set to the fixed logic level 0 in the former half section AM of the predetermined period of time T and converted into the phase encoded signal which repeats the change of the logic levels 0 and 1 in the latter half section PM. The controller 25 repetitively uses the phase encoded signal of one sector obtained by the phase encoding process in three sectors as shown in FIG. 4, thereby generating the phase encoded signal of one track. The controller 25 further repetitively supplies the phase encoded signal of one track to the electron beam irradiating apparatus 10 N times. The electron beam irradiating apparatus 10 directs the electron beam onto the resist layer surface of the master disk 15 only for a period of time during which the supplied phase encoded signal is at the logic level 1. As shown in FIG. 3, a data-0 section and a data-1 section are formed in positions on the resist layer surface corresponding to the land track LT in the PEP area 4. The data-0 section and the data-1 section are sections on a recording track which are used to record data of one bit in the various data (the preamble, sync bit, track address, sector address, reproduction control data, and error detection code shown in FIG. 4) before the phase encoding process to be recorded into the PEP area. In this case, the data-0 section is a section representing the data bit of the logic level 0. A latent image corresponding to the recording pit Pt2 is repetitively formed in the former half section AM of the data-0 section and no latent image is formed in the latter half section PM. The data-1 section is a section representing the data bit of the logic level 1. No latent image is formed in the former half section AM of the data-1 section and a latent image corresponding to the recording pit Pt2 is repetitively formed only in the latter half section PM.

During the above period of time, the controller 25 supplies the phase encoded signal to the electron beam irradiating apparatus 10 at a transmission rate in which the length of an interval of each of the data-1 section and the data-0 section is equal to or less than 30 im.

The master disk 15 rotates at a constant angular velocity and the phase encoded signal of one track is repetitively supplied to the electron beam irradiating apparatus 10 N times. Therefore, in the PEP area 4, as shown in FIG. 3, in each of the N adjacent land tracks LT, the latent images corresponding to the recording pit Pt2 are aligned in the disk radial direction, that is, the direction which crosses perpendicularly the land track LT.

After completion of the recording (the latent image is formed in the resist layer) to the master disk 15 by the master disk recording apparatus, only the latent image portion formed in the resist layer of the master disk 15 is deleted and a mask pattern is formed. Subsequently, a stamper in a convex or concave shape corresponding to the land tracks LT, groove tracks GT, and recording pits Pt is formed by using the mask pattern. A recording disk is copied by the stamper. The PEP area 4 of the copied recording disk thus includes, as shown in FIG. 3, the data-0 section in which a plurality of recording pits Pt2 are continuously formed in the former half section AM while the whole latter half section PM becomes a mirror surface portion. The PEP area 4 also includes the data-1 section in which the whole former half section AM becomes the mirror surface portion while a plurality of recording pits Pt2 are continuously formed in the latter half section PM.

In a disk player for reproducing the recorded information from the recording disk, in order to read the recorded information from the PEP area 4, first, the pickup is moved to a head position of the PEP area 4 and a tracking servo is set into an open state. The recording disk, thus, rotates in an eccentric state and the pickup traces, for example, on a broken line shown in FIG. 3 in the PEP area 4. In this case, as mentioned above, the recording pits Pt2 are recorded on the adjacent land tracks in the PEP area 4 in such a form that they are aligned on the same radius. Therefore, even if the pickup traces so as to traverse each track as shown in the broken line in FIG. 3, a read signal similar to that in the case where the information is correctly read from one track can be obtained.

FIG. 6 is a diagram showing a part of a form of a surface of the writable recording disk as a recording medium according to the invention at the time of shipping from factory.

When manufacturing the writable recording disk, the controller 25 of the master disk recording apparatus shown in FIG. 2 controls the electron beam irradiating apparatus 10, spindle motor 17, and feed stage 18 as follows.

First, the controller 25 drives the electron beam irradiating apparatus 10 to direct the electron beam onto the resist layer surface of the master disk 15 while periodically vibrating an irradiating axis of the electron beam. Further, during this period of time, the controller 25 drives the feed stage 18 so as to be gradually moved in the disk radial direction. By the control as mentioned above, latent images serving as groove tracks GT which are wobbled as shown in FIG. 6 are spirally formed in the positions of the resist layer surface corresponding to the lead-in area 2, information data area 1, and lead-out area 3 of the writable recording disk.

For the position of the resist layer surface corresponding to the PEP area 4, the controller 25 drives the electron beam irradiating apparatus 10 to direct the electron beam onto the resist layer surface of the master disk 15 while fixing the irradiating axis of the electron beam. Latent images serving as groove tracks GT in a non-wobble shape which are not wobbled as shown in FIG. 6 are, thus, formed in the positions of the resist layer surface corresponding to the PEP area 4.

After completion of the recording (the latent image is formed in the resist layer) to the master disk 15 by the master disk recording apparatus, only the latent image portion formed in the resist layer of the master disk 15 is deleted and a mask pattern is formed. Subsequently, a stamper in a convex or concave shape corresponding to the land tracks LT and the groove tracks GT is formed by using the mask pattern. The writable recording disks duplicated by using the stamper.

The groove tracks GT and land tracks LT in the non-wobble shape as shown in FIG. 6 are formed in the PEP area 4 of the copied recording disk. In this process, since the tracks are in the non-wobble shape, the constant angular velocity control of the spindle motor based on the wobble signal and the clock generation by a PLL cannot be performed to the PEP area 4 of the recording disk having the structure described above. To the PEP area 4 of the writable recording disk, thus, a disk recorder cannot record recording marks corresponding to recording pits onto a plurality of tracks in a form similar to that in the PEP area 4 as shown in FIG. 3 recorded on the read only recording disk, that is, in such a form that they are aligned in the direction which crosses perpendicularly the tracks. Since a disk player cannot correctly read the reproduction control data from the PEP area 4 from the recording disk as mentioned above, therefore, it cannot reproduce the information data recorded in the information data area 1. Since the recording disk from which the data cannot be reproduced as mentioned above does not appear on the market, if the structure as shown in FIG. 6 is used as a writable recording disk, an illegal copy act by the RF copy can be prevented.

If a so-called a spindle motor with FG which generates a pulse wave signal (FG pulse) having a frequency according to a rotation speed at the present time is rotated by using a frequency drive control (hereinafter, referred to as FG control), the spindle motor can be rotated at a constant angular velocity without using the wobble signal. In the FG control, the rotation speed of the spindle motor is controlled on the basis of a difference between the FG pulses generated from the spindle motor and a target rotation speed. In the FG control, even to the PEP area having the track structure in the non-wobble shape as shown in FIG. 6, the marks corresponding to the recording pits can be recorded in a form that is almost equivalent to that of the PEP area 4 shown in FIG. 3.

In the read only recording disk according to the invention, however, the length of each of the data-0 section and the data-1 section to be formed in the PEP area 4 shown in FIG. 3 is made equal to or less than 30 im that is approximately twice or less times as long as a rotation jitter of the spindle motor according to the FG control. Currently, it is confirmed that if the spindle motor is rotated at a predetermined constant angular velocity by the FG control, a jitter of approximately 3 isec, that is, a rotation jitter corresponding to the length on the track LT of approximately 15 im is generated, and it is difficult to realize precision higher than that. That is, the size of rotation jitter is equal to the length of ½ of the length of each of the data-0 section and the data-1 section. Therefore, even if the recording marks are recorded by the disk recorder to the PEP area 4 of the writable recording disk while the spindle motor is driven under the FG control, the recording marks corresponding to the recording pits cannot be recorded in a manner that the marks are aligned in the disk radial direction as shown in FIG. 3. That is, if the rotation jitter of the spindle motor reaches the length that is equal to ½ of the length of each of the data-0 section and the data-1 section, there is a possibility that the recording marks corresponding to the recording pits are recorded in the latter half section PM which should inherently become the mirror surface portion in the data-0 section, for example, as shown in FIG. 7. In this case, since the disk player cannot correctly read the reproduction control data from the recording disk in which the PEP area 4 has a form as shown in FIG. 7, the information data recorded in the information data area 1 cannot be reproduced. Since the recording disk from which the data cannot be reproduced as mentioned above will not be put on the market, therefore, the illegal copy act by the RF copy can be prevented.

In the invention as mentioned above, as for the reproduction control data area (PEP area 4) in which the pits in the pit train representing the reproduction control data have been recorded in a plurality of adjacent tracks so as to be aligned in directions which cross the tracks perpendicularly, a length of unit interval on the track corresponding to one bit of the reproduction control data is made shorter than the length which is twice as long as the length of rotation jitter which is generated when the spindle motor is rotated by the FG control. Further, in the invention, the recording tracks are set into the non-wobble shape in the area corresponding to the PEP area provided on the writable recording disk.

According to the invention, therefore, even if the RF copy is executed, the reproduction control data which is necessary for reproducing the information data cannot be correctly recorded onto the writable recording disk, so that the illegal copying by the RF copying can be prevented.

This application is based on a Japanese Patent Application No. 2002-80828 which is hereby incorporated by reference.

What is claimed is:

1. A recording disk having: an information data area in which a pit train indicative of information data has been formed on tracks; and a reproduction control data area in which pits of a pit train on a plurality of adjacent tracks are aligned in directions which cross the tracks perpendicularly, said pit train representing reproduction control data indicative of a reproduction control method to be used for reproduction of said information data, wherein in said reproduction control data area, a length of a unit interval corresponding to one bit of said reproduction control data on each track is shorter than a length that is twice as long as a length of rotation jitter which is caused when a spindle motor to rotate said recording disk is rotated at a predetermined constant angular velocity by frequency drive control.

2. A disk according to claim 1, wherein when said reproduction control data is at a first logic level, the pit train is formed only in a former half section of said unit interval and, when said reproduction control data is at a second logic level different from said first logic level, the pit train is formed only in a latter half section of said unit interval.

3. A disk according to claim 1, wherein said length of a unit interval is equal to or less than 30 im.

4. A disk according to claim 1, wherein said reproduction control data includes tracking information in which a tracking method is shown and/or copy protection information.

5. A recording apparatus for recording information data into an information data area of a recording disk and recording reproduction control data representing a reproduction control method to be used for reproducing said information data into a reproduction control data area of said recording disk, comprising:

an information data recording component for recording a pit train indicative of said information data onto tracks in said information data area;

a reproduction control data recording component for recording a pit train indicative of said reproduction control data onto tracks in said reproduction control data area so that pits in the pit train indicative of said reproduction control data are aligned on a plurality of adjacent tracks in directions which cross the tracks perpendicularly; and a length of a unit interval setting component for setting an interval of said pit trains to be recorded onto the tracks in said reproduction control data area so that a length of a unit interval corresponding to one bit of said reproduction control data on said track is shorter than a length that is twice as long as a length of rotation jitter which is caused when a spindle motor to rotate said recording disk is rotated at a predetermined constant angular velocity by frequency drive control.

6. An apparatus according to claim 5, wherein said reproduction control data recording component includes a portion for recording the pit train only in a former half section of said unit interval when said reproduction control data is at a first logic level and recording the pit train only in a latter half section of said unit interval when said reproduction control data is at a second logic level different from said first logic level.

7. An apparatus according to claim 5, wherein said length of a unit interval is equal to or less than 30 im.

8. An apparatus according to claim 5, wherein said reproduction control data includes tracking information in which a tracking method is shown and/or copy protection information.

* * * * *